UNITED STATES PATENT OFFICE.

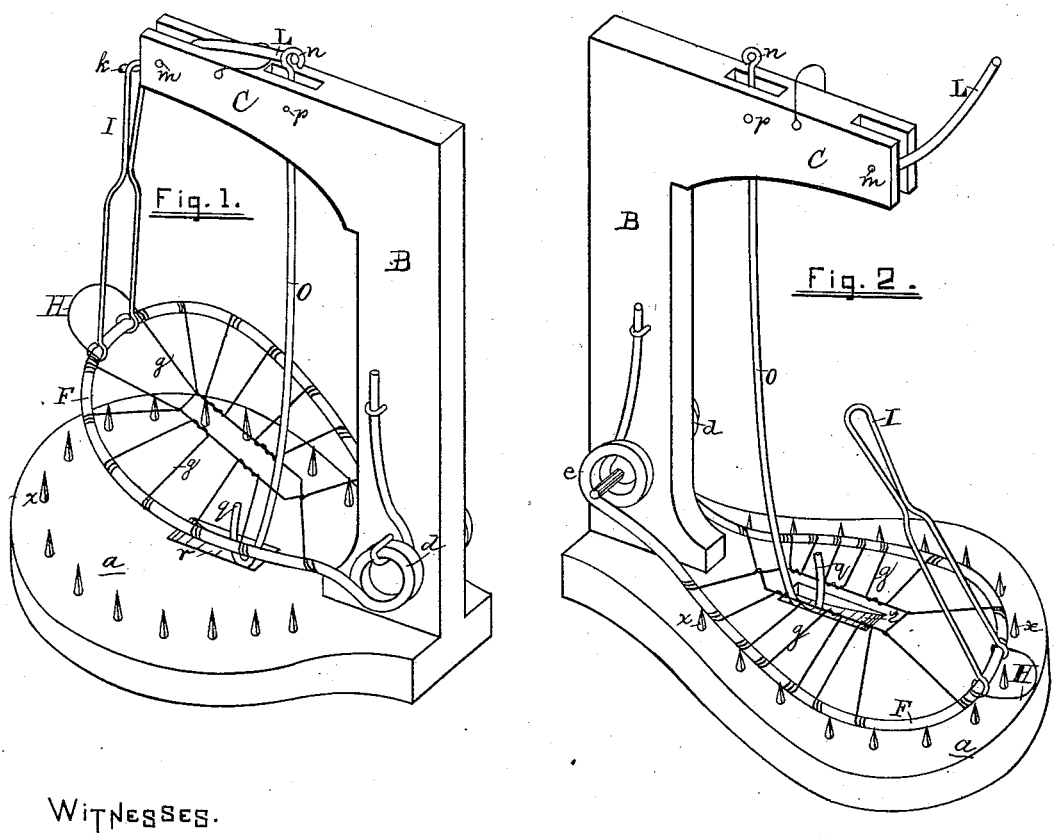

PAULE A. HERBERT, OF NEW ORLEANS, LOUISIANA.

IMPROVEMENT IN ANIMAL-TRAPS.

Specification forming part of Letters Patent No. 191,052, dated May 22, 1877; application filed January 29, 1877.

*To all whom it may concern:*

Be it known that I, PAULE A. HERBERT, a resident of the city of New Orleans, parish of Orleans and State of Louisiana, have invented a certain new and useful Improvement in Animal-Traps; and 1 do hereby declare the following to be a full, clear, and correct description of the same, reference being had to the annexed drawing, making a part of this specification.

This invention relates to the production of a new and improved trap, which is intended not only for the destruction of rats and mice, but for entrapping other animals, whether they be of a larger or smaller species.

In the accompanying drawing, Figure 1 shows the trap ready set for its game, and Fig. 2 the position of the various parts after the trap is sprung.

On the drawing, $a$ represents a platform, having at its rear an upright stem, B, from the top of which projects a horizontal beam, C. On each side of the upright stem, and at a short distance above the platform, is secured, as shown at $d$ and $e$, the curled or spring ends of a stout wire frame, F, across which is woven numerous smaller wires $g$. The outer end of the frame F is provided with a lifting-handle, H, and with a trip-link, I, which, in setting the trap, is designed to engage the short end K, of a trip-lever, L, operating on a pivot, $m$, that is secured near the outer end of the projecting beam C. The inner and longest end of the lever L is at the same time engaged by a hook, $n$, formed at the upper end of the trigger O. The latter is pivoted to the frame as at $p$, and is provided at its lower extremity with a bait-hook, $q$, the lower end of which operates in a recess, $r$, that is cut in the platform, so as to serve as a guide for the said hook, and prevent its being pushed beyond a given point either to side or rear, the object being to have the hook drawn forward by the animal, as the said movement will more readily serve to spring the trap by disengaging the upper end of the aforesaid trigger-lever. The platform is provided in close proximity to the outside of a line formed by the frame, when resting thereupon, with a number of vertical sharp-pointed spikes, $x$, upon one or more of which the animal is securely pinned by the frame F as it springs downward.

Having described my invention, what I claim as new, and desire to secure by Letters Patent, is—

The animal-trap herein described, composed of a spiked platform, $a$, provided with a recess, $r$, and with an upright stem, B, on each side of which is secured the spring ends $d\ e$ of a wire frame, F, which is furnished with a link, I, for engaging one end of a lever, L, that is pivoted in the beam C, so as to be operated by a trigger, O, as described, and for the purpose set forth.

PAULE AUGUST HERBERT.

Witnesses:
 H. N. JENKINS,
 J. C. HUBBELL.